US012203615B2

(12) United States Patent
Rydel et al.

(10) Patent No.: US 12,203,615 B2
(45) Date of Patent: Jan. 21, 2025

(54) SYSTEM FOR A LOW-PROFILE STAGE LUMINAIRE

(71) Applicant: ROBE lighting s.r.o., Roznov pod Radhostem (CZ)

(72) Inventors: Adam Rydel, Hodslavice (CZ); Petr Nemec, Zubri (CZ); Marek Vaclavek, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/620,159

(22) Filed: Mar. 28, 2024

(65) Prior Publication Data

US 2024/0328586 A1 Oct. 3, 2024

Related U.S. Application Data

(60) Provisional application No. 63/493,628, filed on Mar. 31, 2023.

(51) Int. Cl.

| | |
|---|---|
| ***F21S 4/28*** | (2016.01) |
| ***F21S 2/00*** | (2016.01) |
| ***F21V 5/00*** | (2018.01) |
| ***F21V 11/18*** | (2006.01) |
| ***F21V 14/08*** | (2006.01) |
| ***F21V 21/005*** | (2006.01) |

(Continued)

(52) U.S. Cl.

CPC ................ *F21S 4/28* (2016.01); *F21S 2/005* (2013.01); *F21V 5/00* (2013.01); *F21V 11/183* (2013.01); *F21V 14/08* (2013.01); *F21V 21/005* (2013.01); *F21V 23/06* (2013.01); *F21V 25/00* (2013.01); *F21W 2131/406* (2013.01); *F21Y 2103/10* (2016.08); *F21Y 2113/13* (2016.08)

(58) Field of Classification Search

CPC ..... F21S 2/005; F21S 2/00; F21S 4/28; F21V 11/183; F21V 14/08; F21V 21/005

See application file for complete search history.

(56) References Cited

U.S. PATENT DOCUMENTS

2010/0232144 A1 9/2010 Gray
2011/0090680 A1 4/2011 Steinkraus (Continued)

FOREIGN PATENT DOCUMENTS

CN 111550696 A 8/2020
GB 2495161 A 4/2023

OTHER PUBLICATIONS

European Extended Search Report; Application No. 24167908.3; Sep. 30, 2024; 6 pages.

*Primary Examiner* — William N Harris

(74) *Attorney, Agent, or Firm* — Conley Rose, P.C.; Brooks W Taylor

(57) ABSTRACT

A luminaire includes an elongated housing having a long axis, a plurality of light emitters extending in a direction of the long axis, a first light shield rotatably coupled to a base of the luminaire and configured to rotate about a first axis parallel to the long axis, and a second light shield rotatably coupled to the base of the luminaire and configured to rotate about a second axis parallel to the long axis. The first light shield and the second light shield are configured to physically couple to form a combined light shield that is configured to block light emitted by the plurality of light emitters.

18 Claims, 9 Drawing Sheets

(51) Int. Cl.

| | |
|---|---|
| ***F21V 23/06*** | (2006.01) |
| ***F21V 25/00*** | (2006.01) |
| ***F21W 131/406*** | (2006.01) |
| ***F21Y 103/10*** | (2016.01) |
| ***F21Y 113/13*** | (2016.01) |

(56) References Cited

U.S. PATENT DOCUMENTS

| | | | | |
|---|---|---|---|---|
| 2014/0063803 | A1* | 3/2014 | Yaphe | F21V 21/005<br>362/249.03 |
| 2014/0268725 | A1* | 9/2014 | Yu | F21V 33/0012<br>362/220 |
| 2014/0268775 | A1* | 9/2014 | Kennemer | F21V 21/145<br>362/369 |
| 2016/0223152 | A1* | 8/2016 | Baright | F21V 21/005 |
| 2016/0356454 | A1 | 12/2016 | Camarota et al. | |
| 2020/0340633 | A1 | 10/2020 | Chen et al. | |
| 2022/0120390 | A1* | 4/2022 | Dong | F21V 7/005 |
| 2022/0186914 | A1* | 6/2022 | Frankl | F21V 21/30 |
| 2023/0023096 | A1* | 1/2023 | Rizzo | F21V 21/005 |
| 2023/0392761 | A1* | 12/2023 | Xue | F21V 15/015 |

* cited by examiner

SYSTEM FOR A LOW-PROFILE STAGE LUMINAIRE

CROSS-REFERENCE TO RELATED APPLICATIONS

This patent application claims the benefit of U.S. Provisional Application No. 63/493,628, filed Mar. 31, 2023, entitled "SYSTEM FOR A LOW-PROFILE STAGE LUMINAIRE" which is hereby incorporated by reference in its entirety.

TECHNICAL FIELD OF THE DISCLOSURE

The disclosure generally relates to luminaires, and more specifically to a system for a low-profile stage luminaire.

BACKGROUND

Luminaires with a low profile may be used as footlights or cyclorama lights in the entertainment and architectural lighting markets. Such products may be used in theatres, television studios, concerts, theme parks, night clubs, and other venues. A typical low-profile luminaire may be used as a footlight placed on the front of a stage in order to light performers and scenery from the front without obscuring the view of the audience. Such a luminaire may use multiple colors of light emitters under control from a remotely positioned lighting desk allowing an operator to control the color and intensity of the emitted light.

SUMMARY

A luminaire includes an elongated housing having a long axis, a plurality of light emitters extending in a direction of the long axis, a first light shield rotatably coupled to a base of the luminaire and configured to rotate about a first axis parallel to the long axis, and a second light shield rotatably coupled to the base of the luminaire and configured to rotate about a second axis parallel to the long axis. The first light shield and the second light shield are configured to physically couple to form a combined light shield that is configured to block light emitted by the plurality of light emitters.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Luminaires used along an edge of a stage or other acting area to provide lighting for performers and scenery are used in theatrical, film, and TV productions. With the lighting technology available before the introduction of solid-state light sources such as light-emitting diodes (LEDs), such luminaires may be large, bulky fixtures that may be hot and conspicuous. Such luminaires may have exposed connector panels for use in installation and maintenance of the luminaire. Some such luminaires may be designed to retract into the stage when not in use or may be decorated in some way in order to appear to form part of the structure of the stage.

Such technical problems are solved by luminaires according to the disclosure, which comprise LEDs that produce light with less heat and more efficient use of electrical power. Further, luminaires according to the disclosure have a lower, less conspicuous profile that presents less obstruction to audience view.

An additional technical problem encountered in a stage or other acting area concerns the management of cables laid around the edges of the stage. Cables are considered unsightly and can be damaged by shoes or by wheels of set pieces or equipment such as forklifts. Cables can roll if they are stepped on, which may cause a performer or stagehand to fall. Such technical problems are solved by luminaires according to the disclosure, which provide methods for housing cables under covers that provide more secure footing and greater protection from damage.

As such, luminaires according to the disclosure are configured to be installed in continuous runs across a stage, providing a cable cavity to house electrical power and control cabling, presenting a low profile to the audience, and providing unobtrusive access panels for installation and maintenance.

Figure 1:
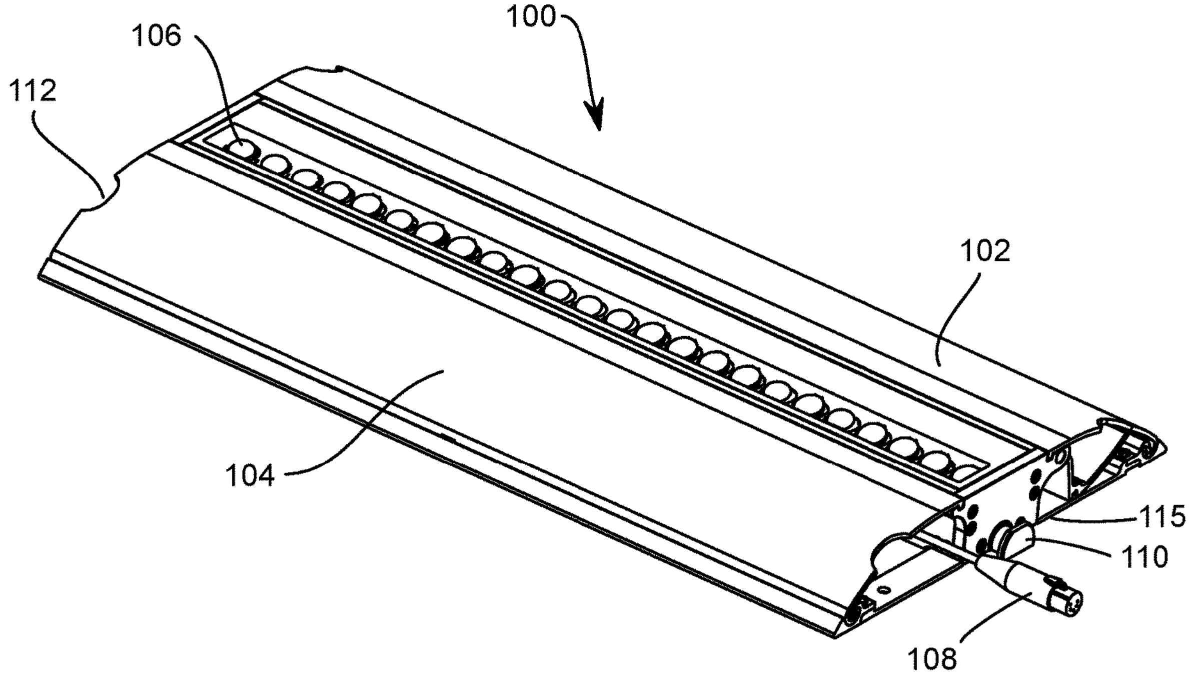
FIG. 1 presents a first orthogonal view of a first luminaire according to the disclosure in a first configuration.

FIG. 1 presents a first orthogonal view of a first luminaire 100 according to the disclosure in a first configuration. FIG.

2 presents a second orthogonal view of the luminaire 100 of FIG. 1. The luminaire 100 includes a plurality of light emitters 106. The luminaire 100 comprises an elongated housing having a long axis (or 'length'). Some or all of the light emitters 106 may include one or more LEDs in one or more colors. Some or all of the light emitters 106 may include integral optical systems such as reflectors, total internal reflection (TIR) light guides, lenses, or other optical devices configured to control and direct light emitted by the LEDs.

In some embodiments, the luminaire 100 is configured to angle the light emitted by the light emitters 106 towards one side of the luminaire 100 along an axis parallel to the length of the luminaire 100. In this way, the light may be directed towards the stage and performers and away from an audience. In some such embodiments, the luminaire 100 is configured to angle this tilt angle by tilted mounting of the light emitters 106 within the luminaire 100 or, additionally or alternatively, by tilting the entire luminaire 100. In some embodiments, one or more of the light emitters 106 are tilted by a different amount than others of the light emitters 106.

The light emitters 106 are configured in a single row extending in the direction of the length of the luminaire 100. In other embodiments, the light emitters 106 may be configured in two or more rows. In various embodiments, the light emitters 106 may be configured in other numbers and/or with other spacings between.

Figure 2:
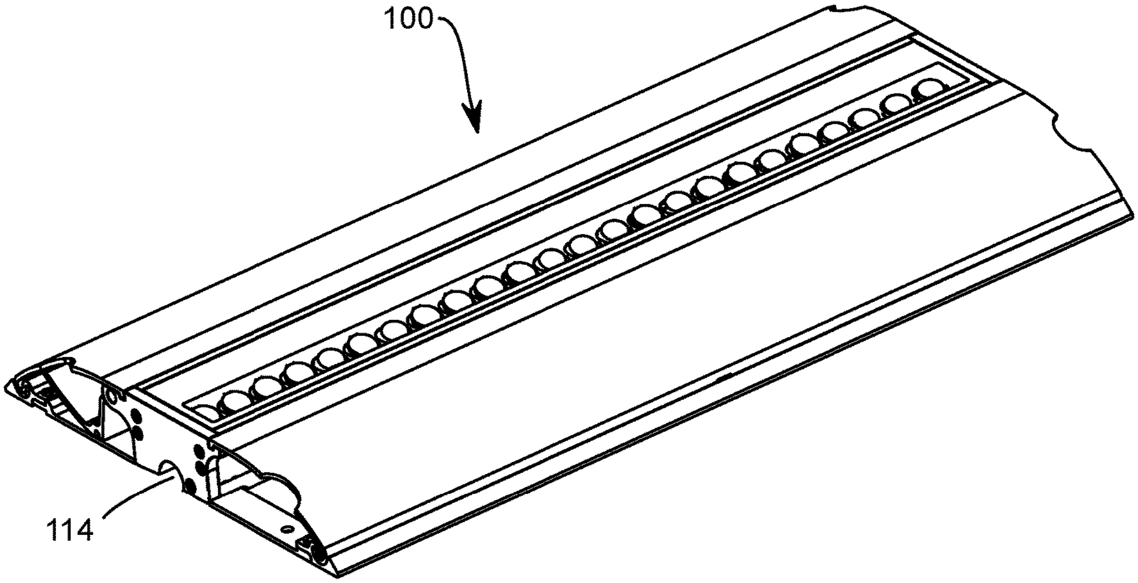
FIG. 2 presents a second orthogonal view of the luminaire of FIG. 1.

The luminaire 100 comprises a first physical connector 110 at a first end (visible in FIG. 1) and a corresponding second physical connector 114 at a second, opposite end (visible in FIG. 2). The first connector 110 comprises a flanged pin and the second connector 114 comprises a socket or slot. The connectors 110 and 114 are configured to physically couple (and in some embodiments to lock together) the luminaire 100 to adjacent luminaires 100. This may enable coupling a plurality of the luminaires 100 to form a continuous, connected run of a desired length.

In some embodiments the luminaire 100 may be straight (as shown in FIGS. 1 and 2). In other embodiments luminaires according to the disclosure may be angled or curved to allow the assembly of luminaire runs that form corners or curves, as desired.

As will be described in more detail with reference to FIGS. 3 and 4, the first and second ends of the luminaire 100 comprise recesses comprising connectors for power and data. A data connector 108 on a cable (also referred to as a 'pigtail' or 'flying lead') is shown in FIG. 1 extending from the first end of the luminaire 100. The recesses in the first and second ends of the luminaire 100 are configured to allow cables electrically coupling the connectors in adjacent luminaires 100 to be connected while the luminaires 100 are separated and then concealed within the recesses when the luminaires 100 are physically coupled to each other.

The luminaire 100 includes a first adjustable light shield 102 and a maintenance access panel 104. As described below, the light shield 102 and the maintenance access panel 104 are rotatably coupled by hinges to a base 115 of the luminaire 100. The light shield 102 and the maintenance access panel 104 include cutouts 112, which are configured to provide room for a user to insert a finger to lift the light shield 102 or the maintenance access panel 104.

Figure 3:
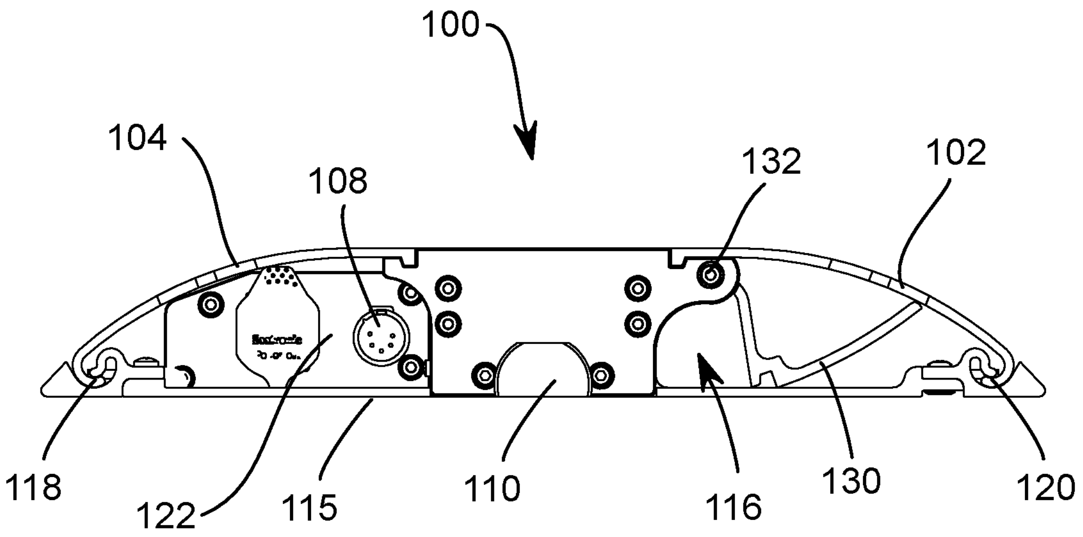
FIG. 3 presents a view of a first end of the luminaire of FIG. 1.

FIG. 3 presents a view of the first end of the luminaire 100 of FIG. 1. FIG. 4 presents a view of the second end of the luminaire 100 of FIG. 1. FIG. 3 shows a recessed output connector plate 122, which includes output power and data connectors, positioned near the first end of the luminaire 100. FIG. 4 shows a recessed input connector plate 124, which includes input power and data connectors, positioned near the second end of the luminaire 100. When assembling an end-to-end run of luminaires 100, a user may provide power cables (not shown in the figures) to electrically connect the output power connector of the output connector plate 122 of a first luminaire 100 to the input power connector of the input connector plate 124 of a second luminaire 100, prior to physically coupling the first and second luminaires 100. If repeated with additional luminaires 100, a continuous, 'daisy-chain' connected line of luminaires 100 may be formed.

In the embodiment shown in FIG. 3, the connector plates 122 and 124 are configured to form a compartment between them when the luminaires 100 are coupled in abutment. In other embodiments, only one or the other of the connector plates 122 and 124 is recessed from its associated end of the luminaire 100 to form the compartment. In all embodiments, the connector plates 122 and 124 are positioned near first and second ends, respectively, of the luminaire 100. Cables that electrically couple the luminaires 100 may be concealed within such compartments. In the embodiment of FIG. 3, the data output connector 108 of the output connector plate 122 comprises a short cable (as shown in FIG. 1) and is configured to be extended into the recess in an adjacent luminaire 100 to electrically couple the data output connector 108 to a data input connector on the input connector plate 124 of the adjacent luminaire 100. In other embodiments, the data output connector may comprise a fixed connector mounted in the output connector plate 122. In some embodiments, neither of the connector plates 122 and 124 is recessed.

Figure 4:
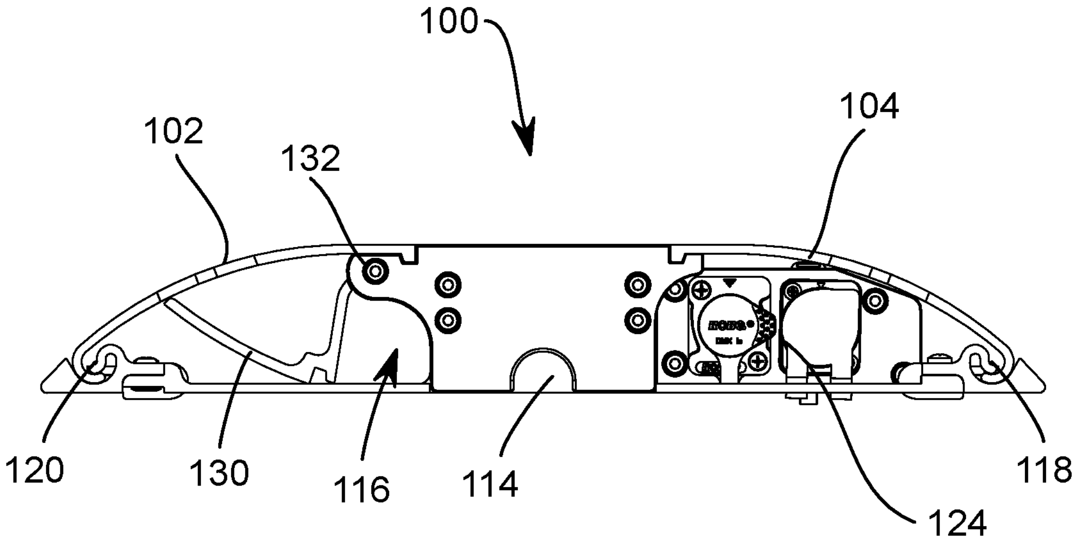
FIG. 4 presents a view of a second end of the luminaire of FIG. 1.

FIGS. 3 and 4 further show that the first adjustable light shield 102 is rotatably coupled to the base 115 by a hinge 120 and configured to rotate around a first axis of rotation. The maintenance access panel 104 is rotatably coupled to the base 115 by a hinge 118 and configured to rotate around a second axis of rotation. A second adjustable light shield 130 is rotatably coupled to the luminaire 100 by a hinge 132 and configured to rotate around a third axis of rotation. The hinges 120, 118, and 132 extend in the direction of the long axis of the luminaire 100. A cable cavity 116 extends the full length of the luminaire 100, between a first aperture at the first end of the luminaire 100 (shown in FIG. 3) and a second aperture at the second end of the luminaire 100 (shown in FIG. 4), and configured to provide a channel for the user to pass cables through. Such cables could be used for other luminaires, for audio devices such as microphones or loudspeakers, for video devices, or for any other devices used on a stage. The cable cavity 116 is configured to protect cables from damage, from view by the audience, and from presenting a tripping hazard for performers or other persons on the stage.

Figure 5A:
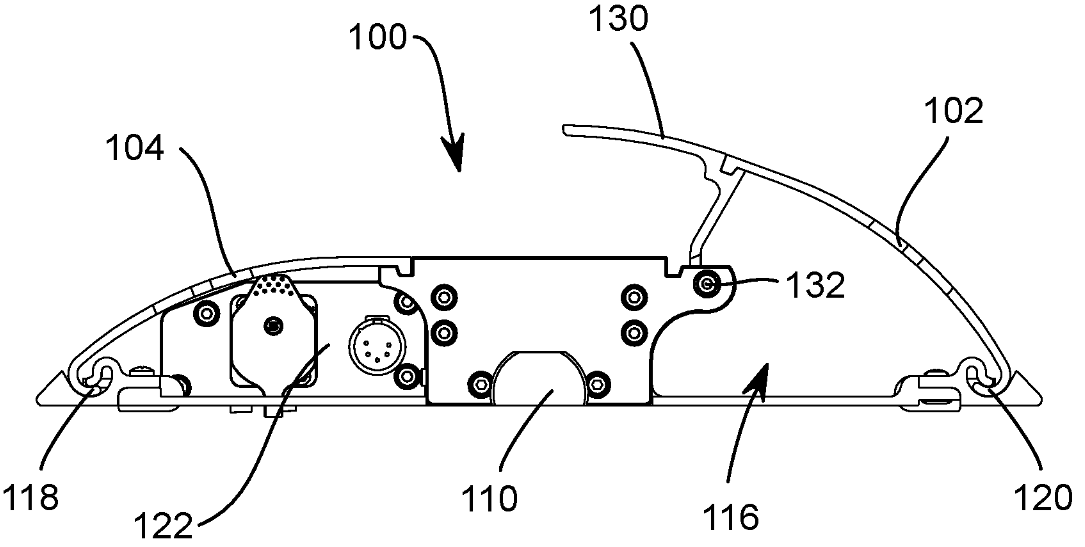
FIG. 5A presents a view of the first end of the luminaire of FIG. 1 in a second configuration.
Figure 5B:
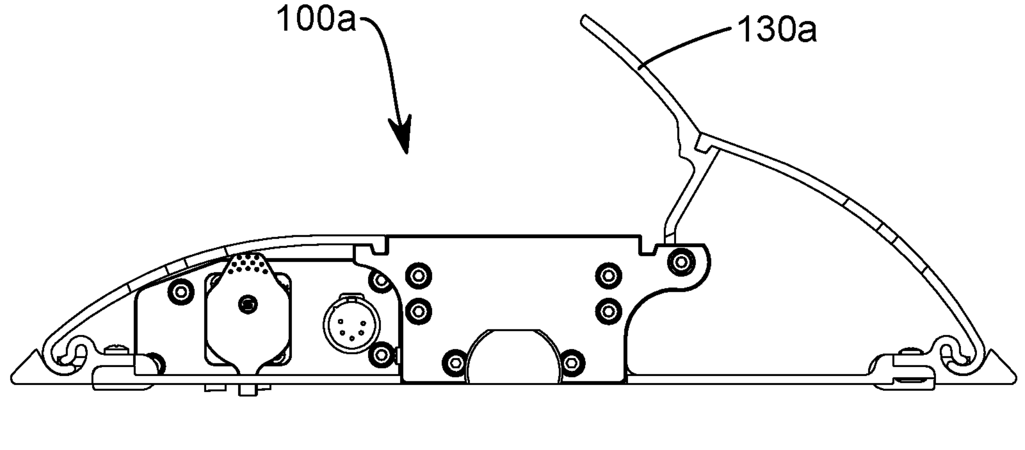
FIG. 5B presents a view of a first end of a second luminaire according to the disclosure in the second configuration.
Figure 5C:
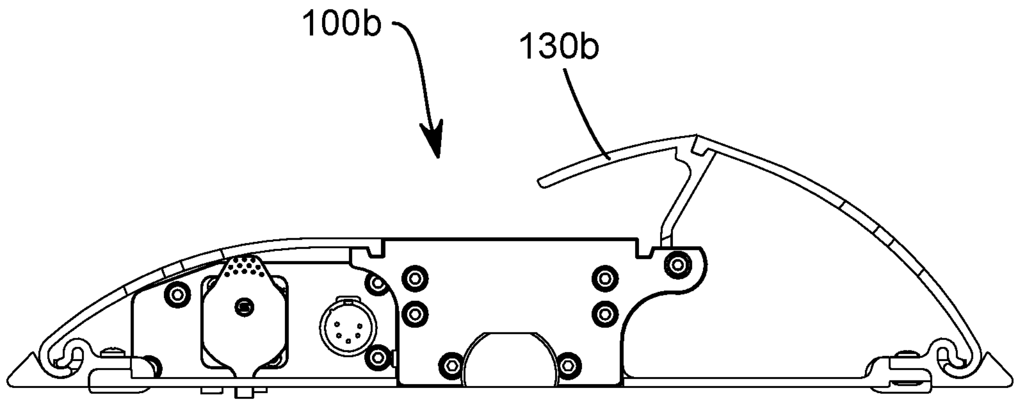
FIG. 5C presents a view of a first end of a third luminaire according to the disclosure in the second configuration.

FIGS. 5A-5C present views of luminaires 100 according to the disclosure in a second configuration. FIG. 5A presents a view of the first end of the luminaire 100 of FIG. 1 in the second configuration. In the second configuration, the first adjustable light shield 102 and the second adjustable light shield 130 are in open positions. To configure the luminaire 100 in the second configuration, the user rotates the first adjustable light shield 102 around the first hinge 120 to gain access to the second adjustable light shield 130. The user rotates the second adjustable light shield 130 around the third hinge 132 to a position in which it can provide support for the first adjustable light shield 102. The first adjustable light shield 102 is then lowered into contact with the second adjustable light shield 130 to physically couple the two adjustable light shields 102 and 130. In the embodiment shown in FIG. 5A, the first adjustable light shield 102 includes a ridge and the second adjustable light shield 130 a corresponding notch. When the ridge is mated with the notch, the first adjustable light shield 102 and the second adjustable light shield 130 are linked to remain in their positions relative to each other. In the second configuration, the first adjustable light shield 102 and the second adjustable light shield 130 are configured to provide a combined light shield that is configured to block light emitted by the light emitters 106 of the luminaire 100 from the view of an audience located to the right of the luminaire 100 as it is shown in FIG. 5A.

FIG. 5B presents a view of a first end of a second luminaire 100*a* according to the disclosure in the second configuration. The luminaire 100*a* includes a second light shield 130*a* that has a cross-sectional shape different from that of the second adjustable light shield 130 of FIG. 5A. However, in the second configuration, the first adjustable light shield 102 and the second light shield 130*a* are still configured to provide a combined light shield that shields the light emitting from the luminaire 100*a* from the audience's view.

FIG. 5C presents a view of a first end of a third luminaire 100*b* according to the disclosure in the second configuration. The luminaire 100*b* includes a second light shield 130*b* that cross-sectional shape that is different from either of the second adjustable light shield 130 of FIG. 5A or the second light shield 130*a* of FIG. 5B. However, in the second configuration, the first adjustable light shield 102 and the second light shield 130*b* are still configured to provide a combined light shield that shields the light emitting from the luminaire 100*b* from the audience's view.

As such, while having different shapes or profiles in the second configuration, each of the luminaires 100, 100*a*, and 100*b* operates to block from the audience's gaze the light emitting from the luminaire. The first adjustable light shield 102 and the second adjustable light shield 130 of luminaire 100 (FIG. 5A) combine to form a single visually connected surface with a smooth curvature. The first adjustable light shield 102 and the second light shield 130*a* of luminaire 100*a* (FIG. 5B) combine to form a surface with a changing, concave curvature. The first adjustable light shield 102 and the second light shield 130*b* of luminaire 100*b* (FIG. 5C) combine to form a surface with a changing, convex curvature.

Figure 6:
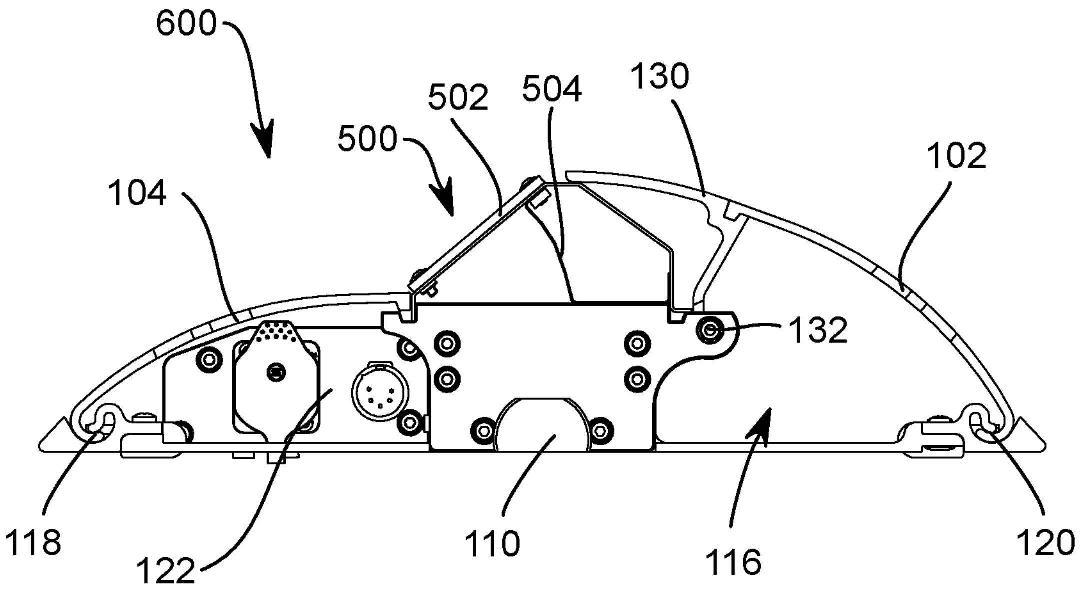
FIG. 6 presents a view of a first end of a fourth luminaire according to the disclosure.

FIG. 6 presents a view of a first end of a fourth luminaire 600 according to the disclosure with a removeable diffuser assembly 500 in position. With the diffuser assembly 500 removed, the luminaire 600 is identical to the luminaire 100. The diffuser assembly 500 includes a reflective surface 504 and an optical diffuser 502. The diffuser assembly 500 is configured to diffuse light emitted by the light emitters 106. The diffuser assembly 500 is configured to be a separate assembly that mounts on the luminaire 600 in front of the adjustable light shield 130 and over the light emitters 106 (which are not shown in FIG. 6). The reflective surface 504 is configured to reflect light emitted by the light emitters 106 through the optical diffuser 502. In various embodiments, the reflective surface 504 may comprise a specular, partially specular, or diffusive reflector. In various embodiments, the optical diffuser 502 is optional but, when included, may be configured to provide any density of diffusion. In embodiments that include the optical diffuser 502, it may comprise a shaped holographic diffuser, linear diffuser, or comprise micro lenses so as to direct light in a predetermined manner.

Figure 7:
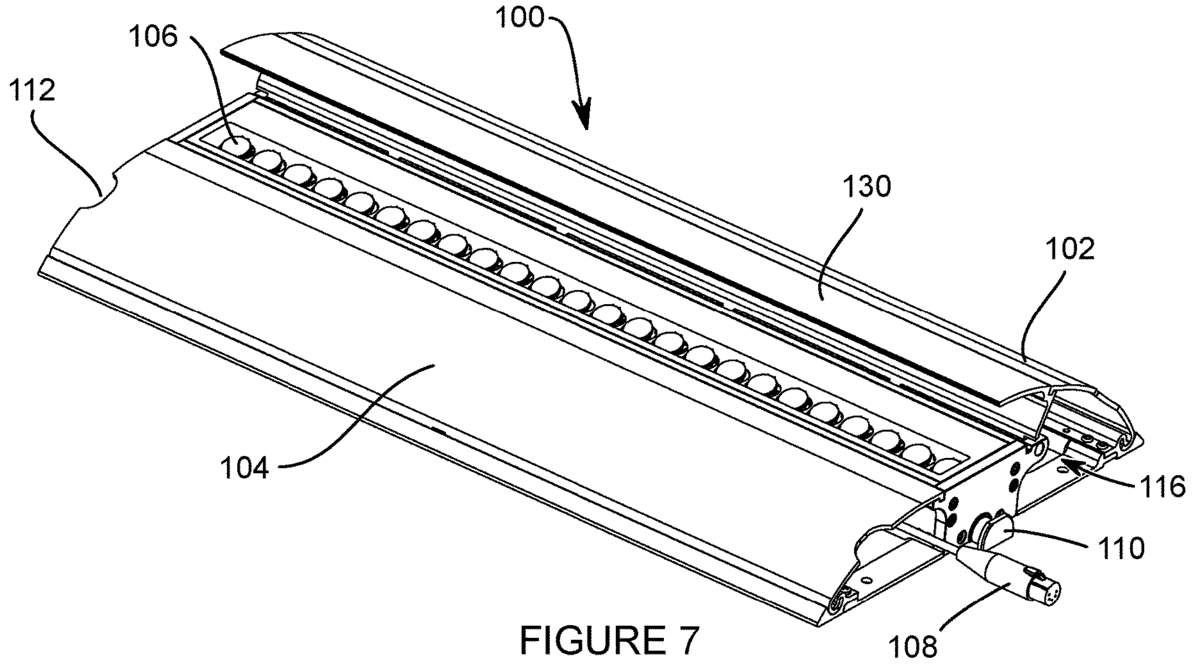
FIG. 7 presents an orthogonal view of the luminaire of FIG. 1 in the second configuration.
Figure 8:
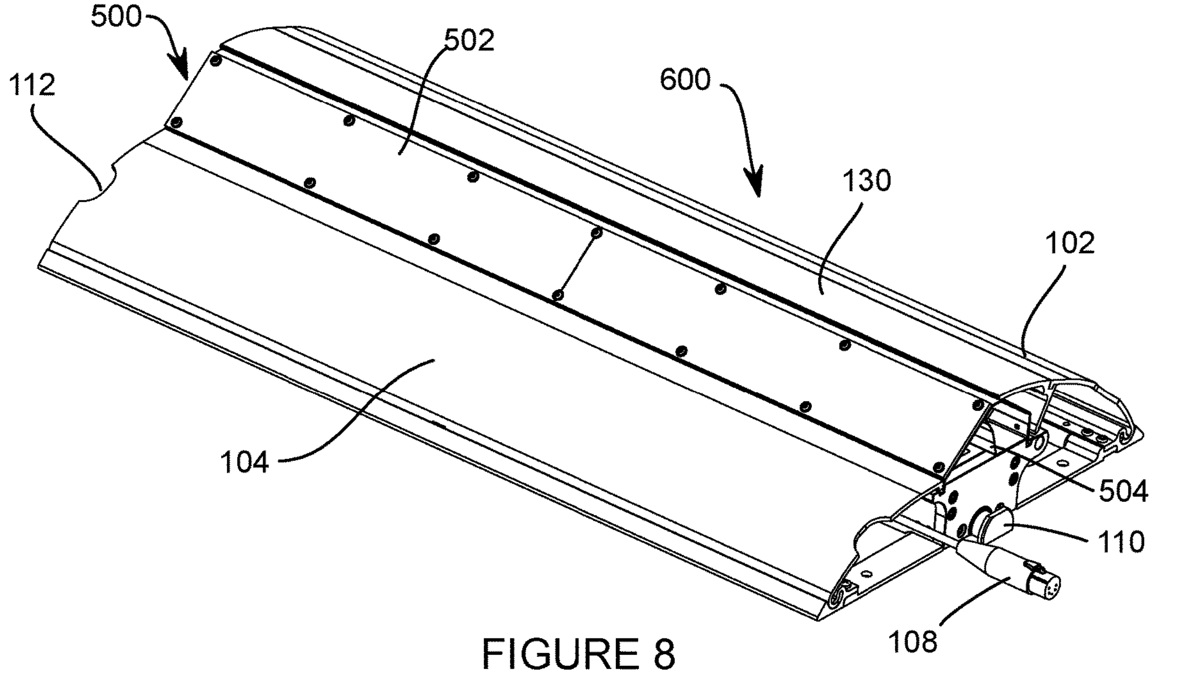
FIG. 8 presents an orthogonal view of the luminaire of FIG. 6.

FIG. 7 presents an orthogonal view of the luminaire 100 of FIG. 1 in the second configuration. The first adjustable light shield 102 and the second light shield 130 are configured to provide a combined light shield. A first end of the cable cavity 116 is visible in FIG. 7. FIG. 8 presents an orthogonal view of the luminaire 600 of FIG. 6 with the diffuser assembly 500 mounted on the luminaire 600. First ends of the reflective surface 504 and the optical diffuser 502 are visible in FIG. 8.

Figure 9:
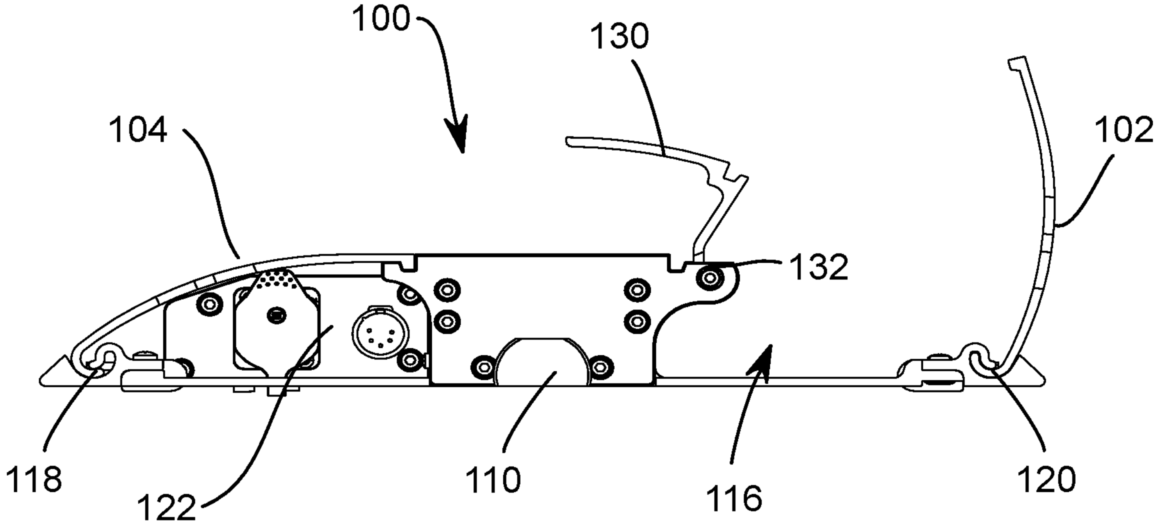
FIG. 9 presents a view of the first end of the luminaire of FIG. 1 in a third configuration.

FIG. 9 presents a view of the first end of the luminaire 100 of FIG. 1 in a third configuration, with the adjustable light shields 102 and 130 in second open positions. The first adjustable light shield 102 is rotated around the first hinge 120 to a fully raised position. In this position it presents a maximum height for shielding light from the audience. The second adjustable light shield 130 may be rotated around the third hinge 132 as desired to further block light.

Figure 10:
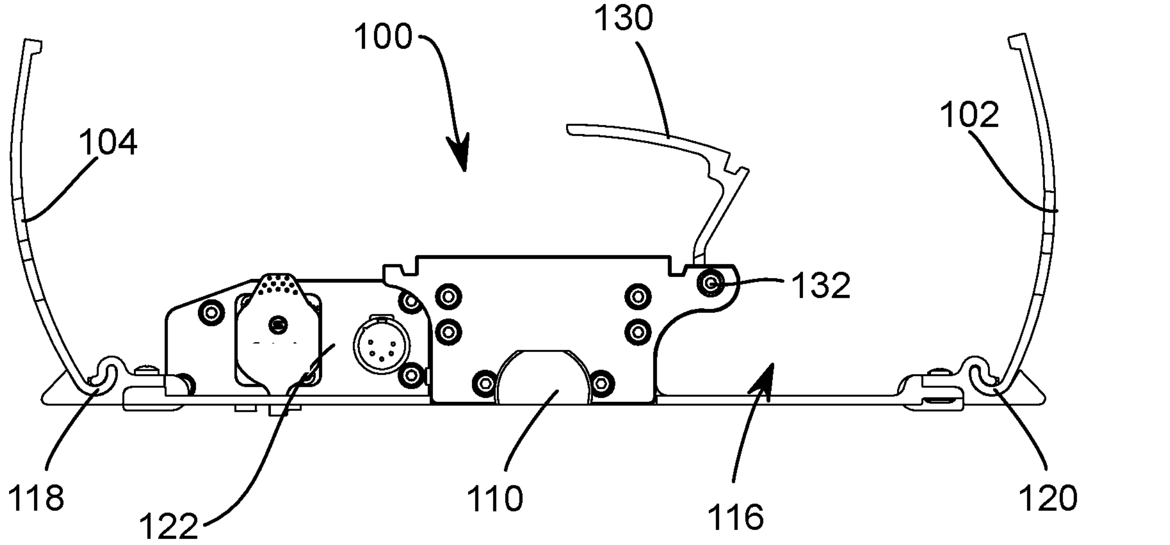
FIG. 10 presents a view of the first end of the luminaire of FIG. 1 in a fourth configuration.
Figure 11:
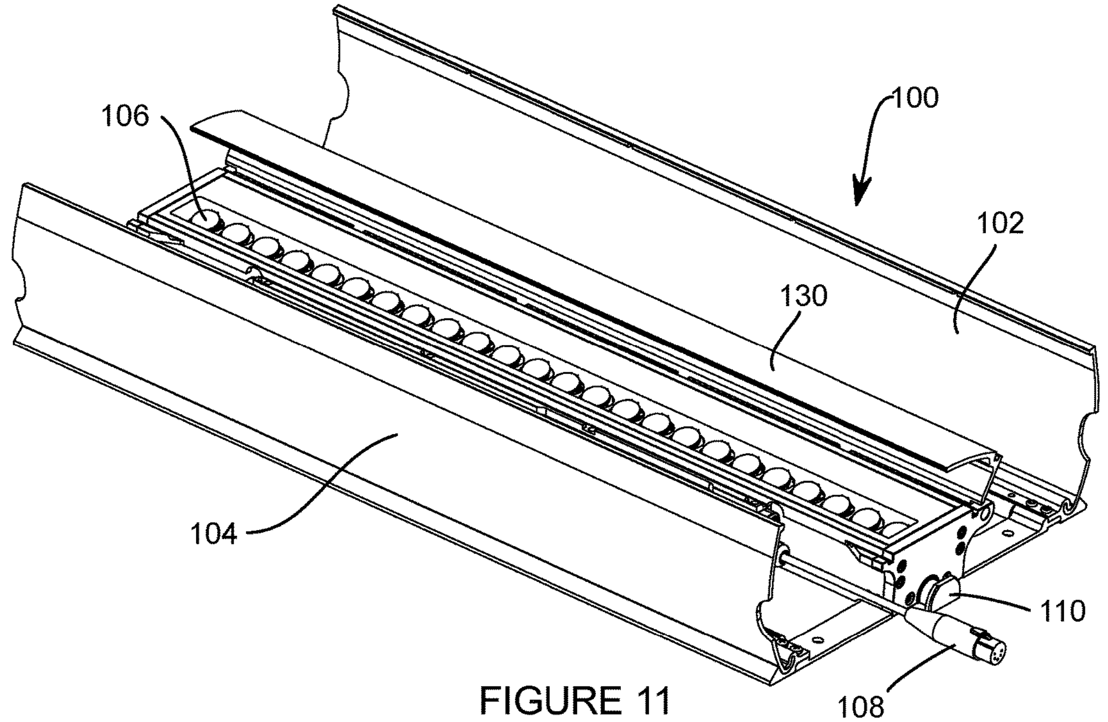
FIG. 11 presents an orthogonal view of the luminaire of FIG. 1 in the fourth configuration.

FIG. 10 presents a view of the first end of the luminaire 100 of FIG. 1 in a fourth configuration, with the first adjustable light shield 102 in a raised position, the second adjustable light shield 130 in a raised position, and the maintenance access panel 104 in a raised position. When raised, the maintenance access panel 104 provides access by a user to a user interface, electronics, and control systems of the luminaire 100. Raising the first adjustable light shield 102 and the second adjustable light shield 130 provides access to cable cavity 116, through which a user may run cables. FIG. 11 presents an orthogonal view of the luminaire 100 in the fourth configuration.

Figure 12:
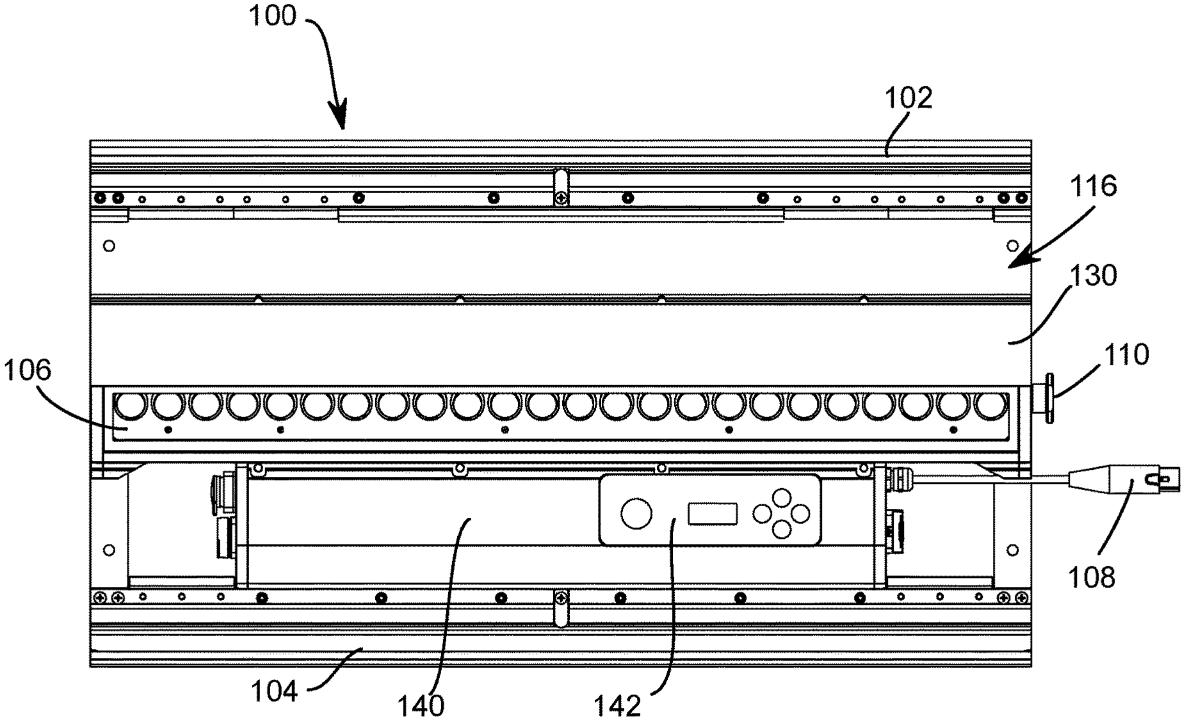
FIG. 12 presents a plan view of the luminaire of FIG. 1 in the fourth configuration.

FIG. 12 presents a plan view of the luminaire 100 of FIG. 1 in the fourth configuration. With maintenance access panel 104 open, the user may access an electronics and power enclosure 140 and a user interface 142. The cable cavity 116 may be seen to be generally clear of obstruction, allowing cables to be laid through the cable cavity 116.

Figure 13:
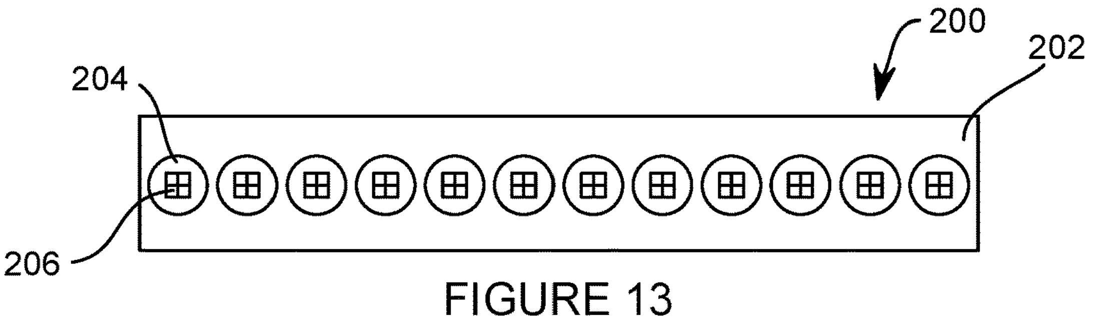
FIG. 13 presents a schematic view of a first light emitter board according to the disclosure.

FIG. 13 presents a schematic view of a first light emitter board 200 according to the disclosure. The light emitter board 200 is suitable for use in the luminaire 100 or other luminaires according to the disclosure. The light emitter board 200 includes a plurality of light emitters 206 each comprising at least one LED. The light emitters 206 are mounted to emit light through associated optical assemblies 204. The optical assemblies 204 may comprise reflectors, total internal reflection (TIR) light guides, lenses, or other optical devices configured to control and direct light emitted by the LEDs. The light emitters 206 and the optical assemblies 204 are mounted on a substrate 202.

In various embodiments, the light emitters 206 may comprise one or more individual LEDs or other light emitting devices. In embodiments where the light emitter 206 includes a plurality of LEDs, the light emitter 206 may be referred to as a multichip. In such embodiments, the individual LEDs may emit light in the same or multiple colors. In some embodiments, the LEDs comprise red, green, blue, and white LEDs. In other embodiments, any combination of colors and/or white LEDs may be used. Examples of such other combinations include a mix of two or more red, green, blue, amber, warm white, cold white, or tunable white LEDs.

Figure 14A:
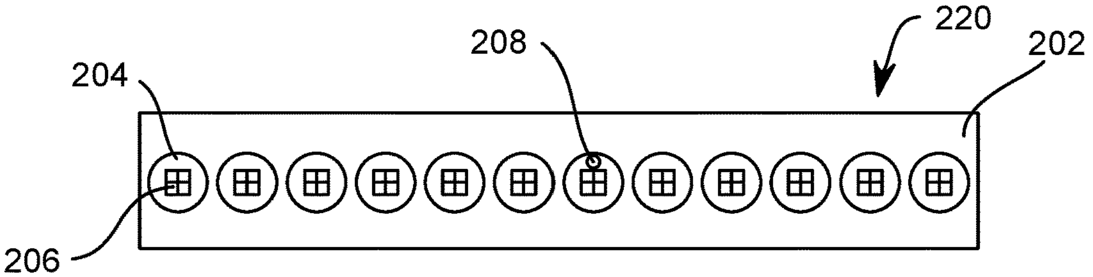
FIG. 14A presents a schematic view of a second light emitter board according to the disclosure.

FIG. 14A presents a schematic view of a second light emitter board 220 according to the disclosure. The light emitter board 220 is suitable for use in the luminaire 100 or other luminaires according to the disclosure. The light emitter board 220 includes the plurality of light emitters 206 and associated optical assemblies 204 of the light emitter board 200, as well as a safety light emitter 208 optically coupled to one of the optical assemblies 204. In various embodiments, the safety light emitter 208 may comprise an LED or other type of light emitting device. In some embodiments, the light emitter board 220 may include a plurality of safety light emitters 208.

When the main light emitters 206 are turned off, the safety light emitter 208 is configured to provide a visual indication to performers on stage as to the position of the luminaire 100. In many cases, this will also indicate the edge of the stage. In such cases, the visual indication enables the performers always to know where the edge of the stage is, even if the rest of the stage lighting is blacked out. When configured in the second or third configuration, the adjustable light shields 102 and 130 also block light emitted by the safety light emitter 208 from being viewed by at least some of the audience.

In some embodiments, the safety light emitter 208 comprises a blue LED emitter, although any color may be used in other embodiments. As described for the light emitters 206, in various embodiments, the safety light emitter 208 may comprise one or more individual LEDs or other light emitting devices in a single color or a plurality of colors. In various embodiments, the safety light emitter 208 emits light at a lower power and/or intensity than the light emitters 206.

In some embodiments, the safety light emitter 208 is configured to be illuminated automatically by a control system of the luminaire 100 when all other light emitters 206 are turned off. In other embodiments, an intensity of the safety light emitter 208 is controlled by an operator of the luminaire 100 via command signals sent to the control system via a control channel on a data link. In still other embodiments, the intensity of the safety light emitter 208 is controlled by a completely separate control system, comprising its own sensors or signal detectors and power supply, which may receive power from emergency or battery-backed power feeds. In any embodiment where the safety light emitter 208 comprises multicolor LEDs, a color of the safety light emitter 208 may also be controlled.

In the embodiment shown in FIG. 14A, the safety light emitter 208 is mounted so that it emits light through the optical assembly 204 associated with one of the light emitters 206. In other embodiments, the safety light emitter 208 is mounted physically separate from any of the light emitting modules 204 and emits light that does not pass through (or is outside of) any of the optical assemblies 204.

Figure 14B:
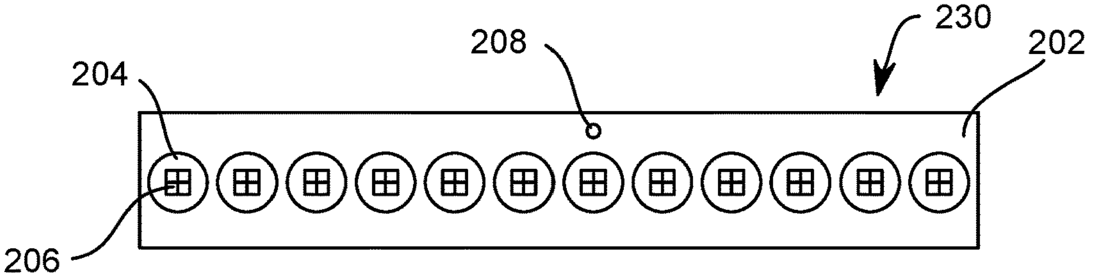
FIG. 14B presents a schematic view of a third light emitter board according to the disclosure.

FIG. 14B presents a schematic view of a third light emitter board 230 according to the disclosure. The light emitter board 230 is suitable for use in the luminaire 100 or other luminaires according to the disclosure. The light emitter board 230 includes the plurality of light emitters 206 and the associated optical assemblies 204 of the light emitter board 220, as well as the safety light emitter 208. However, as described above, the safety light emitter 208 is mounted in the light emitter board 230 physically separate from any of the light emitting modules 204 so that it emits light outside any of the optical assemblies 204 associated with the light emitters 206.

Figure 15A:
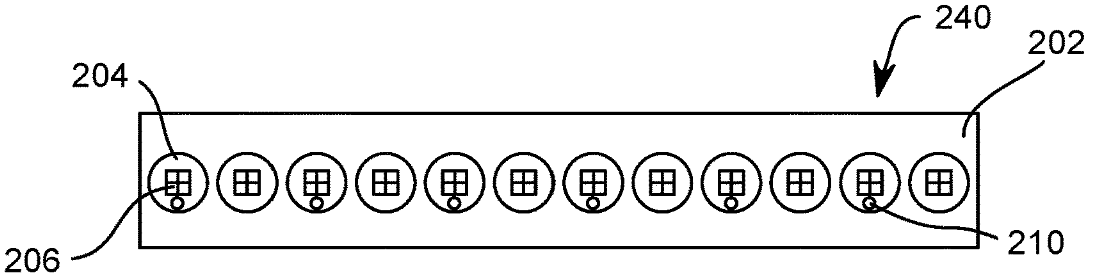
FIG. 15A presents a schematic view of a fourth light emitter board according to the disclosure.

FIG. 15A presents a schematic view of a fourth light emitter board 240 according to the disclosure. In addition to the light emitters 206, the light emitter board 240 includes a plurality of indicator light emitters 210. The plurality of indicator light emitters 210 are optically coupled to a corresponding plurality of the optical assemblies 204. In some embodiments, such corresponding optical assemblies 204 are equally spaced from each other at 4-inch intervals (i.e., the indicator light emitters 210 are regularly spaced) along the light emitter board 240, although any desired spacing (regular or irregular) between the indicator light emitters 210 may be used in other embodiments.

The indicator light emitters 210 are configured to be illuminated individually by a user of the luminaire 100 via command signals sent to the control system of the luminaire 100 via control signals on a data link. Such control of the indicator light emitters 210 solves the problem of providing programmable indications to performers or stage personnel. Various such indications may be provided at different times during a performance. In one example, the indicator light emitters 210 may indicate a desired position (or 'mark') for a performer near the luminaire 100. In another example, some indicator light emitters 210 may be illuminated during a scene change to show performers where to stand and others illuminated to show stage personnel where props should be placed for the next scene. To provide such functionality, the indicator light emitters 210 are controlled individually, so that selected emitters may be illuminated.

In one embodiment the indicator light emitters 210 are red LED emitters, although any color may be used in other embodiments. As described for the light emitters 206, in various embodiments the indicator light emitters 210 may comprise one or more individual LEDs or other light emitting devices. In some embodiments, the indicator light emitters 210 may comprise single color LEDs, multicolor LEDs, or a combination of single color and multicolor LEDs. As described above, the indicator light emitters 210 are individually controllable by the user of the luminaire 100 and thus, when they comprise multicolor LEDs, the user may control a color emitted by individual indicator light emitters 210, as well as whether they are illuminated.

In the embodiment shown in FIG. 15A, the indicator light emitters 210 are mounted so that they emit light through corresponding optical assemblies 204. In other embodiments, some or all of the indicator light emitters 210 are mounted physically separate from any of the light emitting modules 204 and emit light that does not pass through the optical assemblies 204. In various embodiments, the indicator light emitters 210 emit light at a lower power and/or intensity than the light emitters 206. As described for the safety light emitter 208, when configured in the second or third configuration, the adjustable light shields 102 and 130 block light from the indicator light emitters 210 from being viewed by at least some of the audience.

Figure 15B:
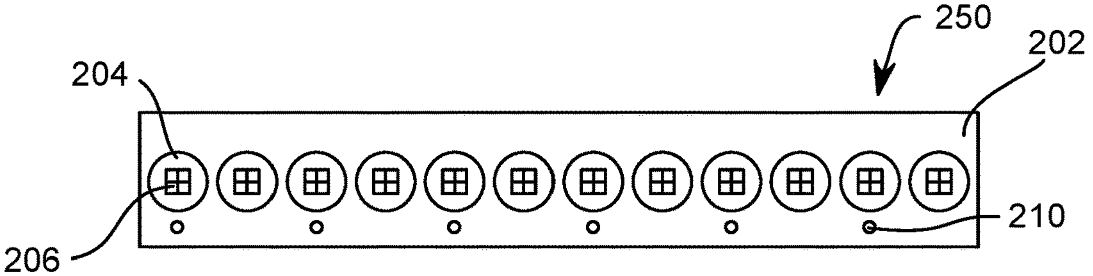
FIG. 15B presents a schematic view of a fifth light emitter board according to the disclosure.

FIG. 15B presents a schematic view of a fifth light emitter board 250 according to the disclosure. The light emitter board 250 is suitable for use in the luminaire 100 or other luminaires according to the disclosure. The light emitter board 250 includes the plurality of light emitters 206 and associated optical assemblies 204 of the light emitter board 240, as well as the indicator light emitters 210. However, as described above, the indicator light emitters 210 are mounted in the light emitter board 250 physically separate from any of the light emitting modules 204 and emit light outside any of the optical assemblies 204 associated with the light emitters 206. While FIG. 15B shows all of the indicator light emitters 210 mounted physically separate from the optical assemblies 204, in other embodiments, some of the indicator light emitters 210 may be mounted to emit light through corresponding optical assemblies 204 and others of the indicator light emitters 210 mounted physically separate from any of the light emitting modules 204.

Figure 16:
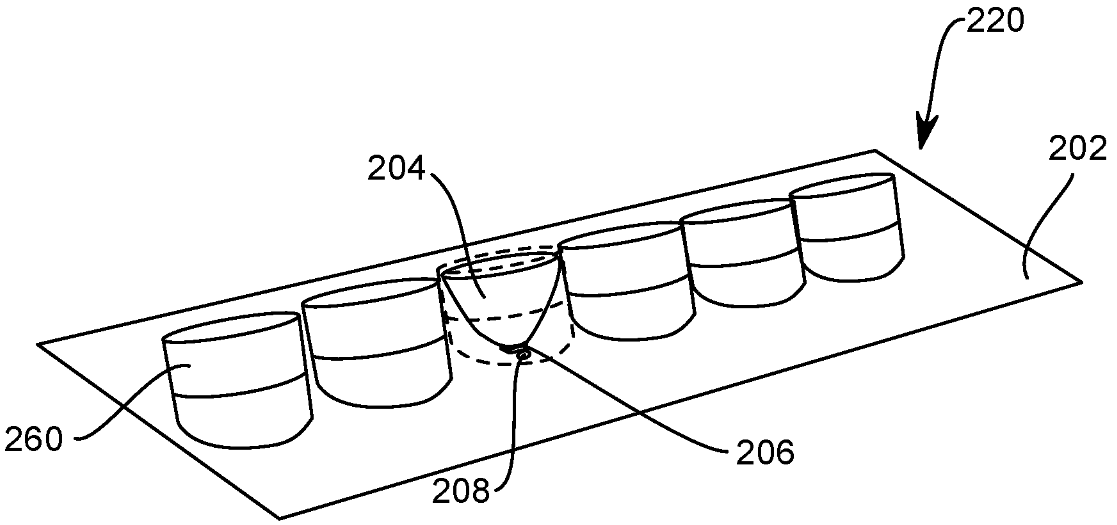
FIG. 16 presents a schematic view of a portion of the light emitter board of FIG. 14A.

FIG. 16 presents a schematic view of a portion of the light emitter board 220 of FIG. 14A. The light emitter board 220 includes a plurality of light emitting modules 260, each comprising one of the light emitters 206 and its corresponding optical assembly 204, mounted on the substrate 202. FIG. 16 further shows the safety light emitter 208, mounted so that the light it emits will pass through the optical assembly 204 along with the light from the light emitter 206.

Figure 17:
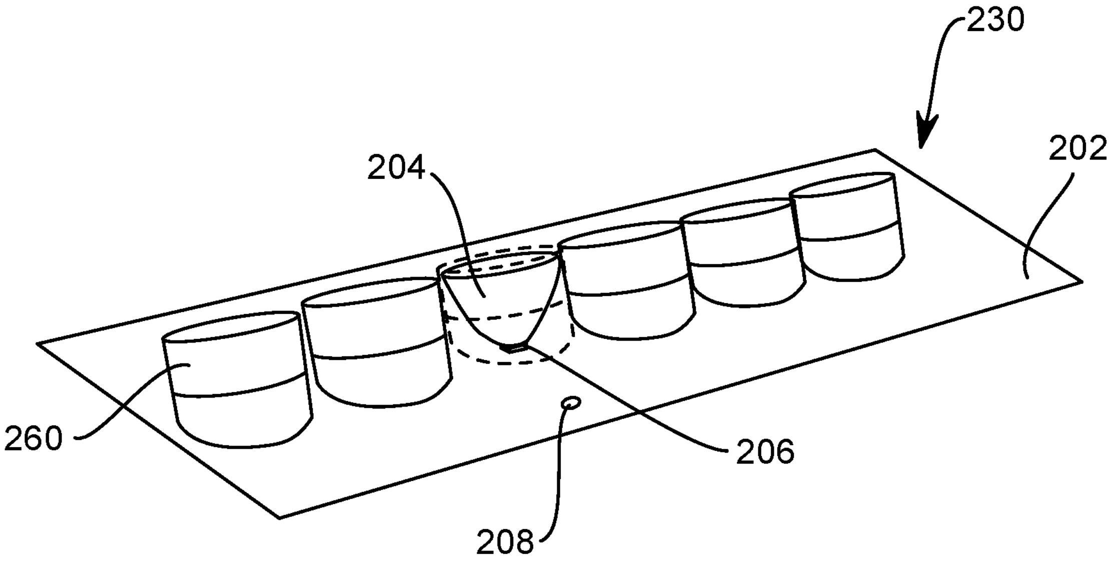
FIG. 17 presents a schematic view of a portion of the light emitter board of FIG. 14B.

FIG. 17 presents a schematic view of a portion of the light emitter board 230 of FIG. 14B. The light emitter board 230 includes a plurality of light emitting modules 260, each comprising one of the light emitters 206 and its corresponding optical assembly 204, mounted on the substrate 202. FIG. 17 further shows the safety light emitter 208, mounted in the light emitter board 230 physically separated from any of the light emitting modules 240, so that the safety light emitter 208 emits light that does not pass through any of the light emitting modules 240.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:

an elongated housing having a long axis;

a plurality of light emitters extending in a direction of the long axis;

a first light shield rotatably coupled to a base of the luminaire, configured to rotate about a first axis parallel to the long axis; and a second light shield rotatably coupled to the base of the luminaire, configured to rotate about a second axis parallel to the long axis, wherein the first light shield and the second light shield are configured to contact each other to physically couple to form a combined light shield configured to block light emitted by the plurality of light emitters in a first direction perpendicular to the long axis and to pass light emitted by the plurality of light emitters in a second direction perpendicular to the long axis.

2. The luminaire of claim 1, further comprising a maintenance access panel rotatably coupled to the base of the luminaire, configured to rotate about a third axis parallel to the long axis.

3. The luminaire of claim 1, further comprising:

an output connector plate comprising an output power connector and an output data connector, the output connector plate positioned near a first end of the luminaire; and an input connector plate comprising an input power connector and an input data connector, the input connector plate positioned near a second end of the luminaire.

4. The luminaire of claim 3, wherein one or both of the output connector plate and the input connector plate is recessed from its associated end of the luminaire.

5. The luminaire of claim 1, further comprising:

a first physical connector at a first end of the luminaire; and a second physical connector at a second end of the luminaire, wherein the first physical connector and the second physical connector are configured to physically couple the luminaire to adjacent luminaires.

6. The luminaire of claim 5, wherein:

the first physical connector comprises a flanged pin; and the second physical connector comprises a socket or slot.

7. The luminaire of claim 1, wherein a light emitter of the plurality of light emitters emits light through an optical assembly.

8. The luminaire of claim 7, further comprising a safety light emitter.

9. The luminaire of claim 8, wherein the safety light emitter emits light through the optical assembly.

10. The luminaire of claim 8, wherein the safety light emitter is physically separate from the optical assembly and emits light that does not pass through the optical assembly.

11. The luminaire of claim 1, wherein:

the plurality of light emitters is a first plurality of light emitters; and the luminaire further comprises a second plurality of indicator light emitters.

12. The luminaire of claim 11, wherein:

a light emitter of the first plurality of light emitters emits light through an optical assembly.

13. The luminaire of claim 12, wherein an indicator light emitter of the second plurality of indicator light emitters emits light through the optical assembly.

14. The luminaire of claim 13, wherein:

the indicator light emitter is a first indicator light emitter; and a second indicator light emitter of the second plurality of indicator light emitters is physically separate from the optical assembly and emits light that does not pass through the optical assembly.

15. The luminaire of claim 1, further comprising a cable cavity extending between a first aperture at a first end of the luminaire and a second aperture at a second end of the luminaire, wherein the first end is at an opposite end of the long axis of the elongated housing from the second end.

16. The luminaire of claim 15, wherein access to the cable cavity is provided by rotating the first light shield about the first axis.

17. The luminaire of claim 1, further comprising a diffuser assembly configured to diffuse light emitted by the plurality of light emitters.

18. The luminaire of claim 17, wherein the diffuser assembly comprises a reflective surface and an optical diffuser, the reflective surface configured to reflect light emitted by the plurality of light emitters through the optical diffuser.

* * * * *